(12) United States Patent
Jin et al.

(10) Patent No.: US 9,262,196 B2
(45) Date of Patent: Feb. 16, 2016

(54) VIRTUAL MACHINE DEPLOYMENT PLANNING METHOD AND ASSOCIATED APPARATUS

(71) Applicant: International Business Machines Corporation, Armonk, NY (US)

(72) Inventors: Xing Jin, Beijing (CN); Le He, Beijing (CN); Wu Yu Hui, Beijing (CN); Qing Bo Wang, Beijing (CN); Bao Hua Cao, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 14/147,572

(22) Filed: Jan. 5, 2014

(65) Prior Publication Data

US 2014/0337844 A1 Nov. 13, 2014

Related U.S. Application Data

(63) Continuation of application No. 13/325,097, filed on Dec. 14, 2011, now abandoned.

(30) Foreign Application Priority Data

Nov. 30, 2010 (CN) .......................... 2010 1 0577047

(51) Int. Cl.
*G06F 9/455* (2006.01)
(52) U.S. Cl.
CPC .. *G06F 9/45558* (2013.01); *G06F 2009/45562* (2013.01)

(58) Field of Classification Search
None
See application file for complete search history.

(56) References Cited

U.S. PATENT DOCUMENTS

| 2006/0123386 | A1 | 6/2006 | Tameshige et al. | |
|---|---|---|---|---|
| 2007/0078988 | A1* | 4/2007 | Miloushev et al. | 709/227 |
| 2007/0136721 | A1* | 6/2007 | Dunshea et al. | 717/174 |
| 2010/0169881 | A1 | 7/2010 | Silvera et al. | |
| 2010/0281482 | A1* | 11/2010 | Pike et al. | 718/102 |
| 2012/0102491 | A1* | 4/2012 | Maharana | 718/1 |

FOREIGN PATENT DOCUMENTS

EP 1059582 A2 2/2000

OTHER PUBLICATIONS

IBM TDB; Masemore, TL and Milburn, JH, "Job Window Processing Control Feature", IBM Technical Disclosure Bulletin, vol. 37, No. 04A, Apr. 1994, IP.com No. IPCOM000112034D; 5 pages.

* cited by examiner

*Primary Examiner* — Craig Dorais
(74) *Attorney, Agent, or Firm* — Cantor Colburn LLP

(57) ABSTRACT

A method and related apparatus and planner are provided. The method comprises receiving information about relationship of activation items in a plurality of virtual machines as well as information including activation item descriptive parameters. In addition, the method comprises of steps of optimizing an activation order of the activation items in said virtual machines according to said relationship among the activation items and generating an activation logical file according to the optimized activation order and said activation item descriptive parameters.

12 Claims, 11 Drawing Sheets

PRIOR ART

VIRTUAL MACHINE DEPLOYMENT PLANNING METHOD AND ASSOCIATED APPARATUS

CROSS REFERENCE TO RELATED APPLICATIONS

This application is a continuation of U.S. application Ser. No. 13/325,097 filed Dec. 14, 2011, which claims priority under 35 U.S.C. §119 from Chinese Patent Application No. 201010577047.2 filed in China. Each of said applications is incorporated by reference herein.

BACKGROUND OF THE INVENTION

1. Field of the Invention

The present invention relates to virtual machine technology, and more specifically to a virtual machine deployment planning method and associated apparatus.

2. Description of Background

At present, the computer virtual machine technology is increasingly widely used, especially in a distributed environment. A virtual appliance corresponding to a virtual solution is divided into a plurality of virtual machines, i.e., virtual images. The virtual machines may be located in a same physical entity (e.g. a same computer) or in different physical entities.

FIG. 1 is a block diagram showing a processing device (e.g. computer) in the prior art. The processing device 1 comprises a virtual machine deployment and activation tool 11, virtual machines 12 and associated activation parameter profiles 13. The virtual machine deployment and activation tool 11 is used for creating and deploying the virtual machines 12 and coordinating activation of the virtual machines 12. The virtual machine 12 comprises an activation engine 121, activation items (activation scripts) 122 and an activation logical file 123.

The activation item 122 is a script compiled for a task that must be performed in the virtual machine 12. For example, if a web application server, a network and a database are to be deployed in a virtual machine, three scripts of ConfigWAS, ConfigNet and ConfigDB can be compiled for the virtual machine.

FIG. 3 shows contents of the activation logical file 123 in the prior art, comprising descriptive parameters of the activation items and dependence relations among the activation items. The descriptive parameters of the activation items are different from the activation parameters saved in the activation parameter profile 13. The activation parameters refer to those parameters that are required for activating the activation items, e.g., specific values of network IP addresses required for activating the network. The descriptive parameters of the activation items describe which activation parameters are needed, e.g. describing "needing network IP addresses", but are not concerned with specific values.

As for the dependence relations among the activation items, as an example, as shown in FIG. 8A, the activation of the activation item B2 deployed on the virtual machine B depends on the activation of the activation item C2 deployed on the virtual machine C and the activation item B3 deployed on the virtual machine B; in turn, the activation of the activation items A2 and A3 deployed on the virtual machine A depends on the activation of the activation item B2 deployed on the virtual machine B.

The activation parameter profile 13 is a document for storing specific activation parameter values required for activating the activation items. The activation engine 121 is used for activating the activation items 122 in the virtual machine 12. It reads the specific activation parameters in the activation parameter profile 13 and invokes activation items 122 associated with the activation parameters when reading the associated activation parameters. The descriptive parameters of the activation items in the activation logical file 123 describe which activation parameters are required for activating the activation items. It provides a basis for specific values of which activation parameters are to be stored in the activation parameter profile 13.

FIG. 2 shows a process to be undergone before the virtual machine 12 is instanced on a physical entity, comprising: a creation phase, a deployment phase and an activation phase. The creation phase is a phase to install the activation engine 121, the activation items 122 and the activation logical file 123 comprised in the virtual machine into the physical entity. In a step S1, an image building tool 111 installs the activation engine 121 onto the physical entity. In a step S2, the image building tool 111 installs the activation items 122 compiled by the user onto the physical entity. In a step S3, the developer compiles into the activation logical file the activation item descriptive parameters and the dependence relations among the activation items. As shown in FIG. 1, in an instance, the step S1 may be executed by an activation engine installer 1111, the step S2 may be executed by an activation item installer 1112, and the step S3 is artificially executed by the developer, that is, there lacks an automatic execution tool.

The basic framework of the virtual machine 12 has been created through the virtual machine creation phase. However, the activation of the activation items 122 further needs specific activation parameters which are obtained through the virtual machine deployment phase. In a step S4, a deployment tool 112 generates a deployment parameter collection page for user deployment. In a step S5, after the user inputs the activation parameters, the deployment tool 112 receives the user inputted activation parameters. In a step S6, the deployment tool 112 generates the activation parameter profile 13 containing the user inputted activation parameters.

The activation of the activation items 122 can be performed only by use of the activation parameters in the activation parameter profile 13 in combination with the activation items 122. As shown in FIG. 1, in an instance, the step S4 may be executed by an activation parameter collection page generator 1121, the step S5 may be executed by an activation parameter receiver 1122, and the step S6 may be executed by an activation parameter profile generator 1123.

The activation phase is a phase for customizing required operating systems, networks, application resources and etc. for the virtual machines. The activation items created in the creation phase can be instanced only in the activation phase in combination with the activation parameters in the activation parameter profile 13. Since the activation logical file 123 stores the dependence relations among the activation items, the activation engine 121 must make reference to the dependence relations while invoking the activation items 122. The activation engine randomly selects an order of activating the activation items 122 inside the virtual machine on the premise that the dependence relations are not violated, but the order is not necessarily optimal. There lacks in the prior art a technique capable of automatically optimizing the activation order of the activation items 122 inside the virtual machines.

An activation coordinator 113 is responsible for, after an activation item in the virtual machine has been activated, notifying activation items depending on the activation item in other virtual machines of the start of activation. As shown in FIG. 8A, the activation of the activation item B1 deployed on the virtual machine B depends on the activation of the activation item C2 deployed on the virtual machine C. Therefore, after the activation engine in the virtual machine C activates the activation item C2, it notifies the activation coordinator 113 of that the activation item B1 in the virtual machine B that depends on the activation of the activation item C2 can be activated. The activation coordinator 113 notifies the activation engine in the virtual machine B of the activation of the activation item B 1.

A problem existing in the prior art is that, in the step S3, it is the developer that compiles in the activation logical file the activation item descriptive parameters and the dependence relations among the activation items. That is to say, the user must be proficient in compiling the activation logical file, as is difficult for those inexperienced users.

In addition, since in the prior art, the activation engine randomly selects an order of activating the activation items 122 inside the virtual machines on the premise that the dependence relations among the activation items in the activation logical file are not violated, the order is not necessarily optimal. Consequently, it is desirable to implement a technique capable of automatically optimizing the activation order of the activation items inside the virtual machines.

SUMMARY OF THE INVENTION

The shortcomings of the prior art are overcome and additional advantages are provided through the provision of a virtual machine deployment planning method and related apparatus and planner. The method comprises receiving information about relationship of activation items in a plurality of virtual machines as well as information including activation item descriptive parameters. In addition, the method comprises of steps of optimizing an activation order of the activation items in said virtual machines according to said relationship among the activation items and generating an activation logical file according to the optimized activation order and said activation item descriptive parameters.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

In the following discussion, a great amount of concrete details are provided to help thoroughly understand the present invention. However, it is apparent to those of ordinary skill in the art that even though there are no such concrete details, the understanding of the present invention would not be influenced. In addition, it should be further appreciated that any specific terms used below are only for the convenience of description, and thus the present invention should not be limited to only use in any specific applications represented and/or implied by such terms.

Figure 1:
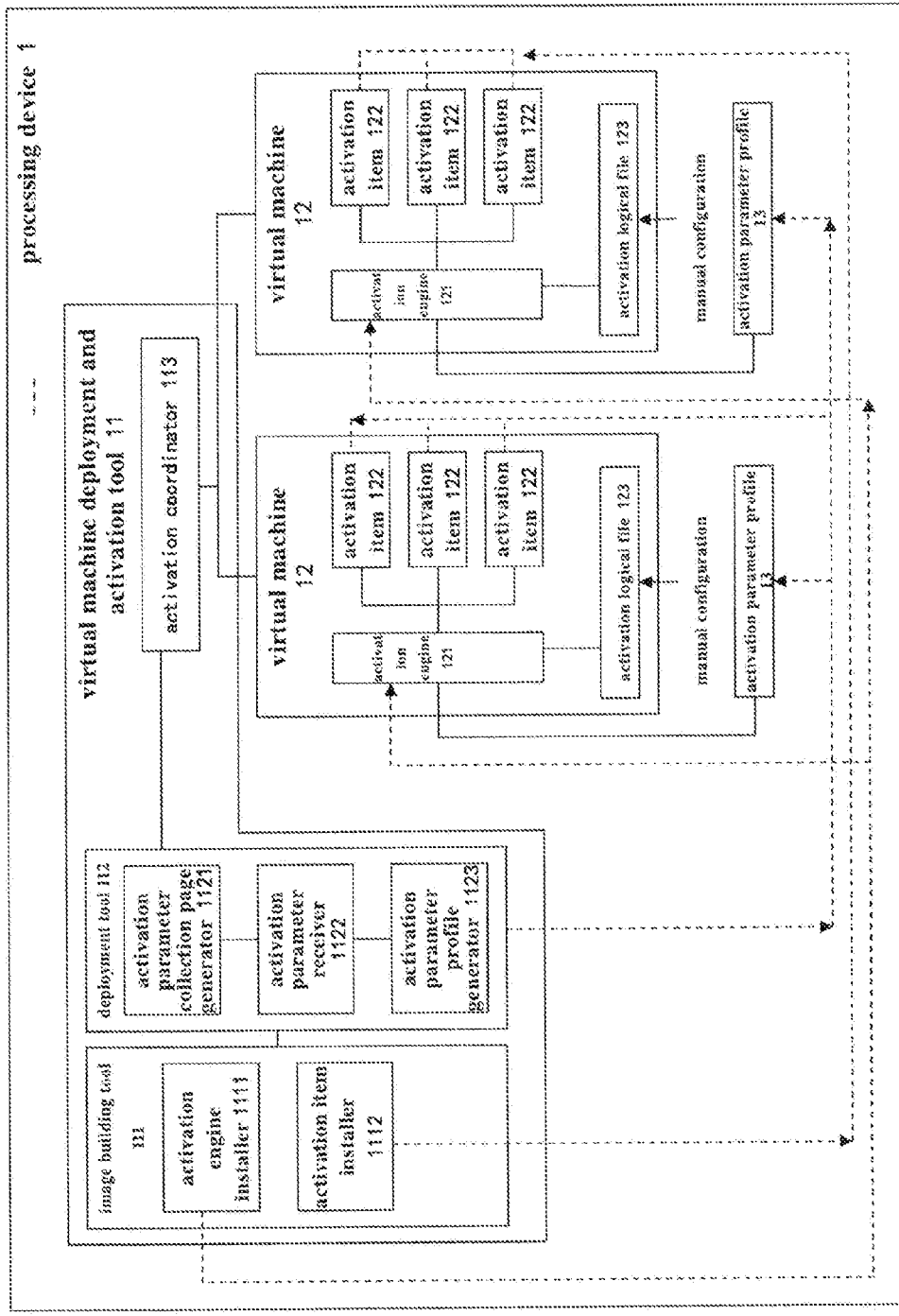
FIG. 1 is a block diagram showing a processing device (e.g. computer) in the prior art.
Figure 4:
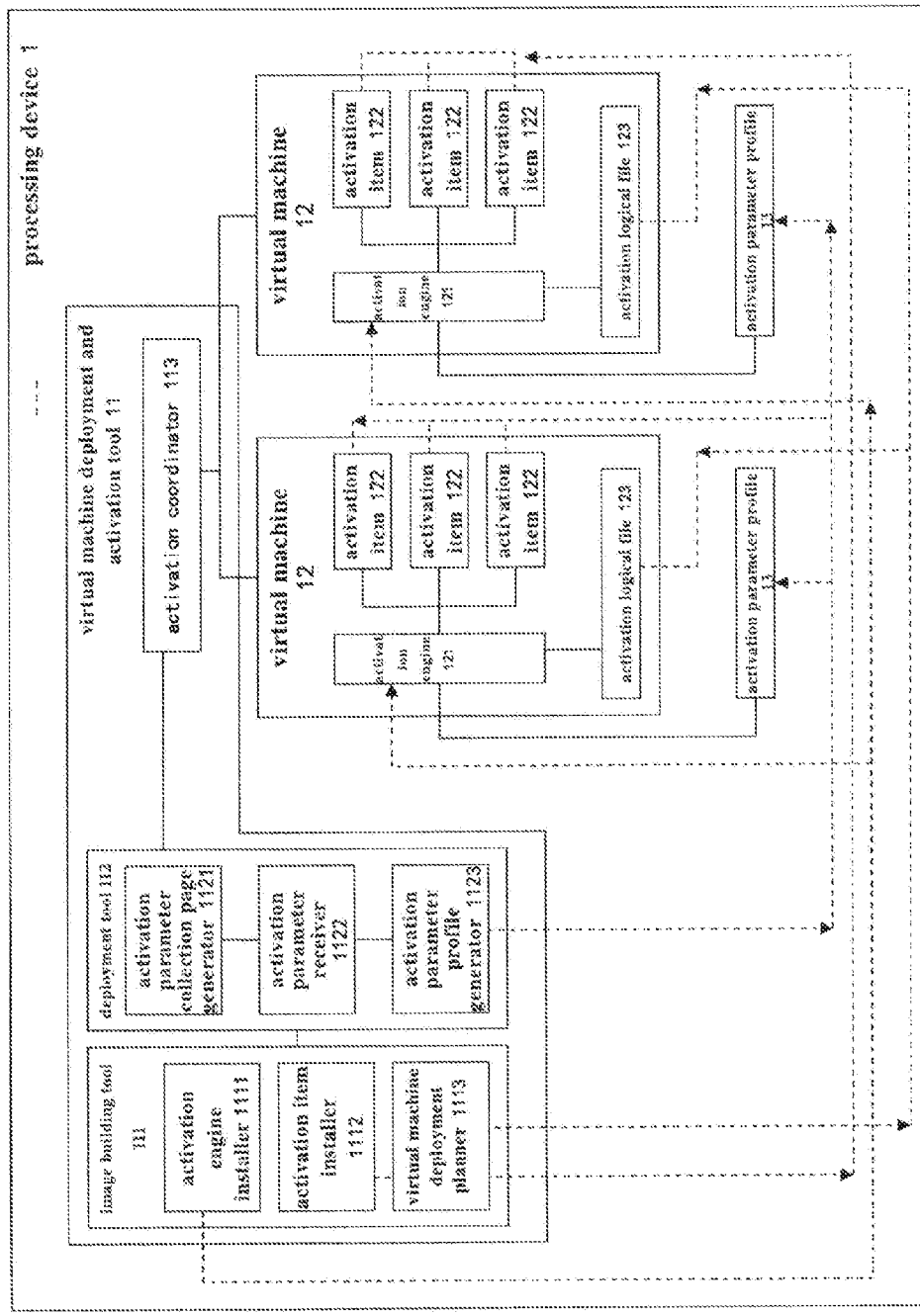
FIG. 4 is a block diagram showing a processing device according to an embodiment of the invention.
Figure 5:
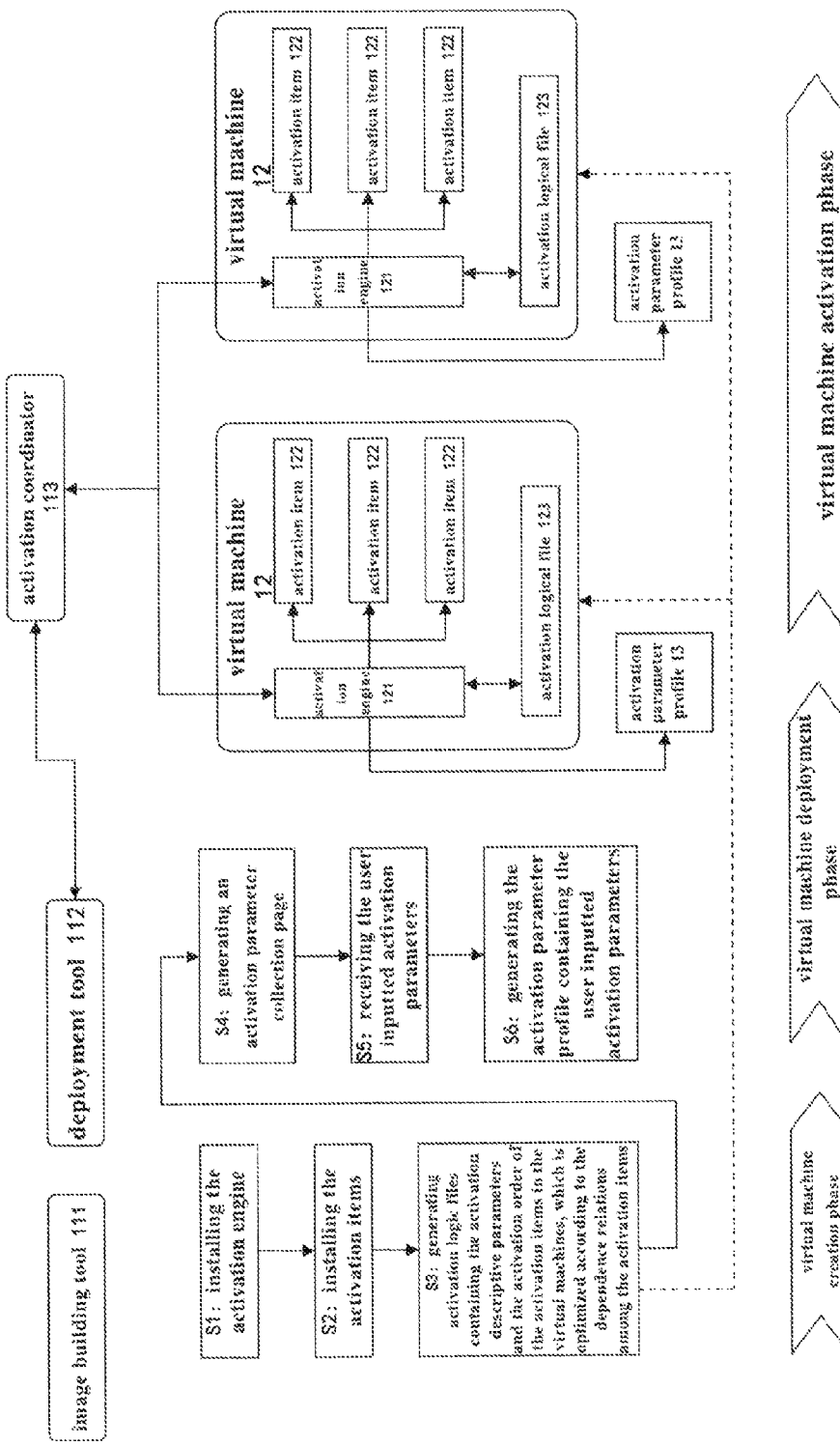
FIG. 5 shows a process to be undergone before the virtual machine is instanced on a physical entity according to an embodiment of the invention, which essentially corresponds to the block diagram of FIG. 4.
Figure 6:
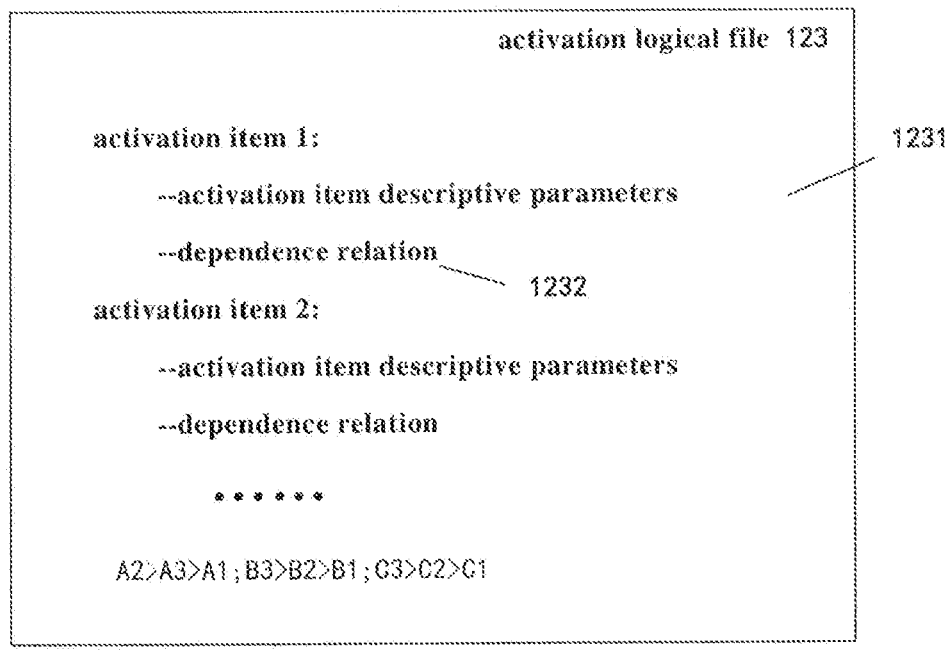
FIG. 6 shows contents of the activation logical file according to an embodiment of the invention.

Operating principles of an embodiment of the invention are described briefly first with reference to FIGS. 4-6. FIG. 4 differs from FIG. 1 in adding to the image creation tool 111 a virtual machine deployment planner 1113, for automatically compiling the activation logical file 123, such that those users who are not proficient in compiling the activation logical file can also perform the creation of the virtual machine, thus improving user friendliness. Other portions of FIG. 4 are substantially similar to those of FIG. 1.

Figure 2:
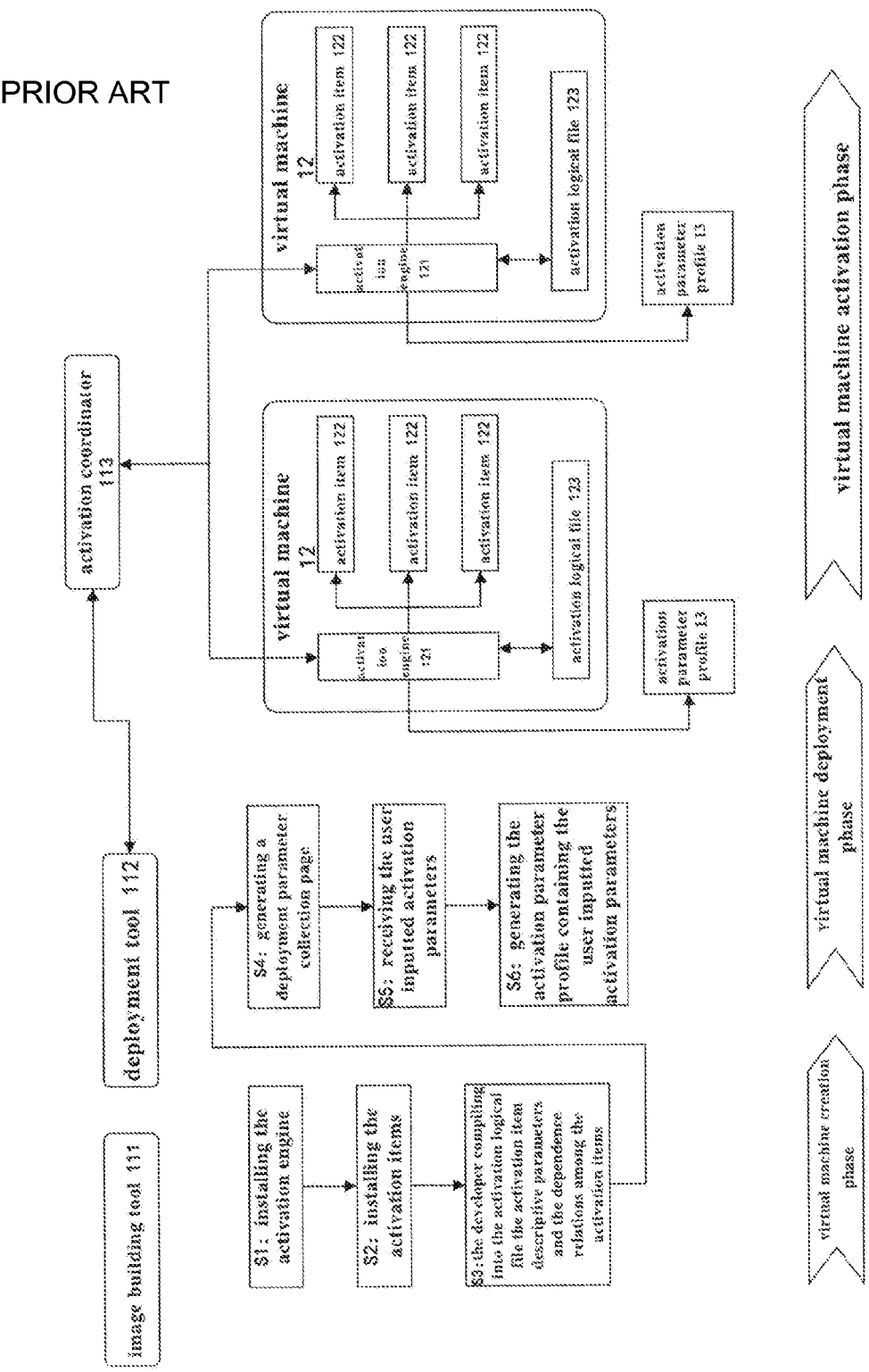
FIG. 2 shows a process to be undergone in the prior art before the virtual machine is instanced on a physical entity, which essentially corresponds to the block diagram of FIG. 1.

FIG. 5 differs from FIG. 2 in replacing the step S3 with a step S3'. In the step S3', the virtual machine deployment planner 1113 generates an activation logical file containing activation item descriptive parameters, and an activation order of the activation items in the virtual machines, which is optimized according to the dependence relations among the activation items. In the prior art, the activation engine randomly selects the activation order of the activation items inside the virtual machines on the premise that the dependence relations among the activation items in the activation logical file are not violated. So the order is not necessarily optimal. However, according to an embodiment of the invention, automatic optimization of the activation order of the activation items inside the virtual machines is achievable. Other portions of FIG. 5 are substantially similar to those of FIG. 2.

Figure 3:
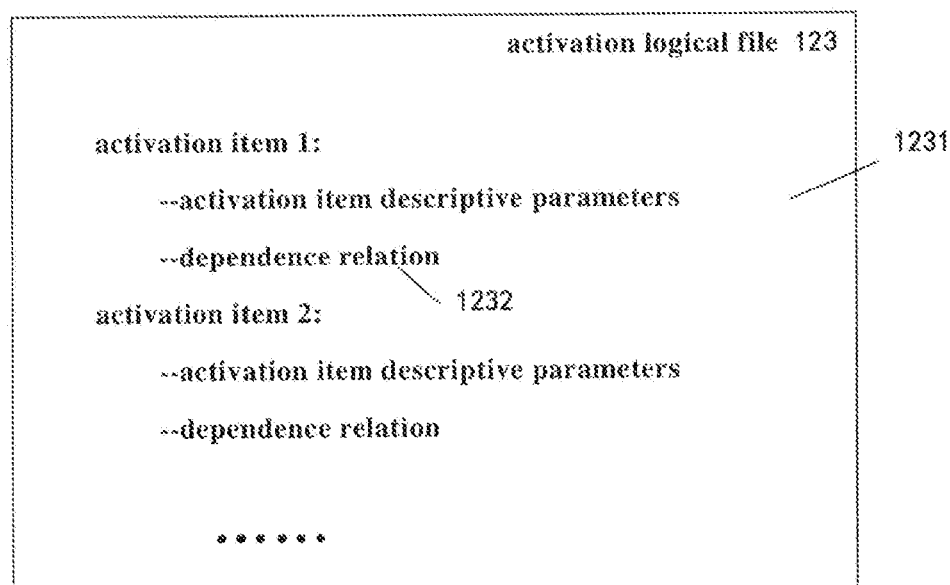
FIG. 3 shows contents of the activation logical file in the prior art.

FIG. 6 differs from FIG. 3 in that, in addition to descriptive parameters 1231 of the activation items and dependence relations 1232 among the activation items, the activation logical file 123 according to an embodiment of the invention further contains an optimized activation order of the activation items inside the virtual machines, which is determined by the virtual machine deployment planner 1113. For example, A2>A3>A1 represents that, in the virtual machine A, first the activation item A2, then the activation item A3, and finally the activation item A1 are activated. In this way, when the activation engine 121 activates the activation items in the virtual machine A, it does not randomly select an order but activates the activation items according to the optimized activation order A2>A3>A1.

Figure 7:
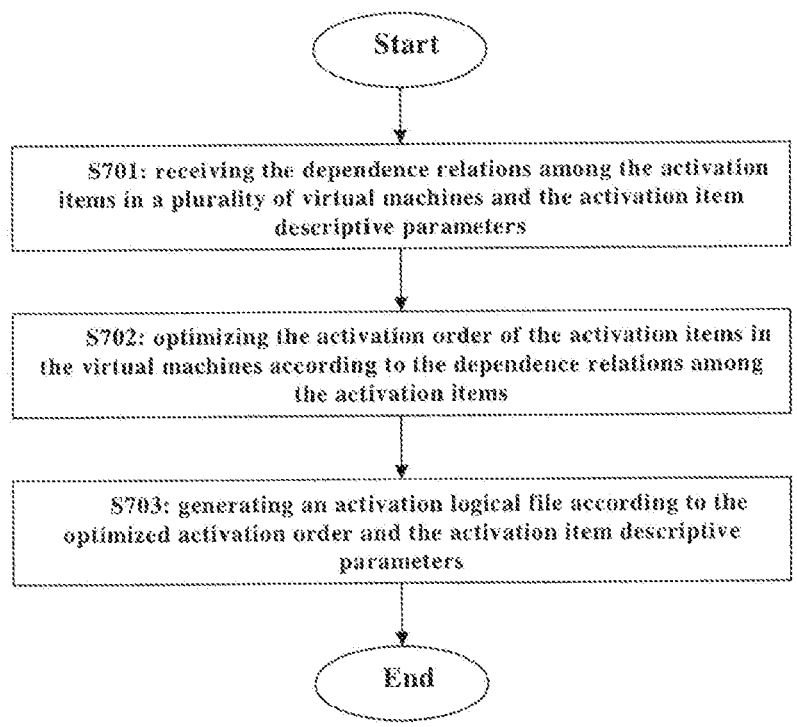
FIG. 7 is a flow chart showing a virtual machine deployment planning method according to an embodiment of the invention.

FIG. 7 is a flow chart showing a virtual machine deployment planning method according to an embodiment of the invention. In a step S701, the dependence relations among the activation items in a plurality of virtual machines and the activation item descriptive parameters are received. One implementation thereof is to provide an interface to enable the user to input the dependence relations among the activation items in the plurality of virtual machines and the activation item descriptive parameters. Then, the user only needs to input through the interface the dependence relations among the activation items in a plurality of virtual machines and the activation item descriptive parameters, without the need of learning how to compile the activation logical file 123, which greatly simplifies the user's operation and reduces basic skills necessarily possessed by the user. Of course, the reception can also be implemented by any other well known receiving means in the art.

In a step S702, the activation order of the activation items in the virtual machines is optimized according to the dependence relations among the activation items. As an implementation, it can be implemented by, but not restricted to the following process. Firstly, an initial planning order of the virtual machine is determined.

In an implementation, if a number that activation of an activation item in a virtual machine depends on activation of an activation item in another virtual machine is larger than a number that activation of an activation item in the another virtual machine depends on activation of the activation items in the virtual machine, it is determined that the activation of the virtual machine as a whole depends on the activation of the another virtual machine; if not, it is determined that the activation of the another virtual machine as a whole depends on the activation of the virtual machine. Then, a whole dependence relation tree is drawn according to the determined dependence relations of activation of the virtual machines. The initial planning order is determined according to an order from a virtual machine which is most independent on to a virtual machine which is most dependent on in the whole dependence relation tree. An order of activating the virtual machines which are equally dependent on is arbitrarily selected.

Figure 8A:
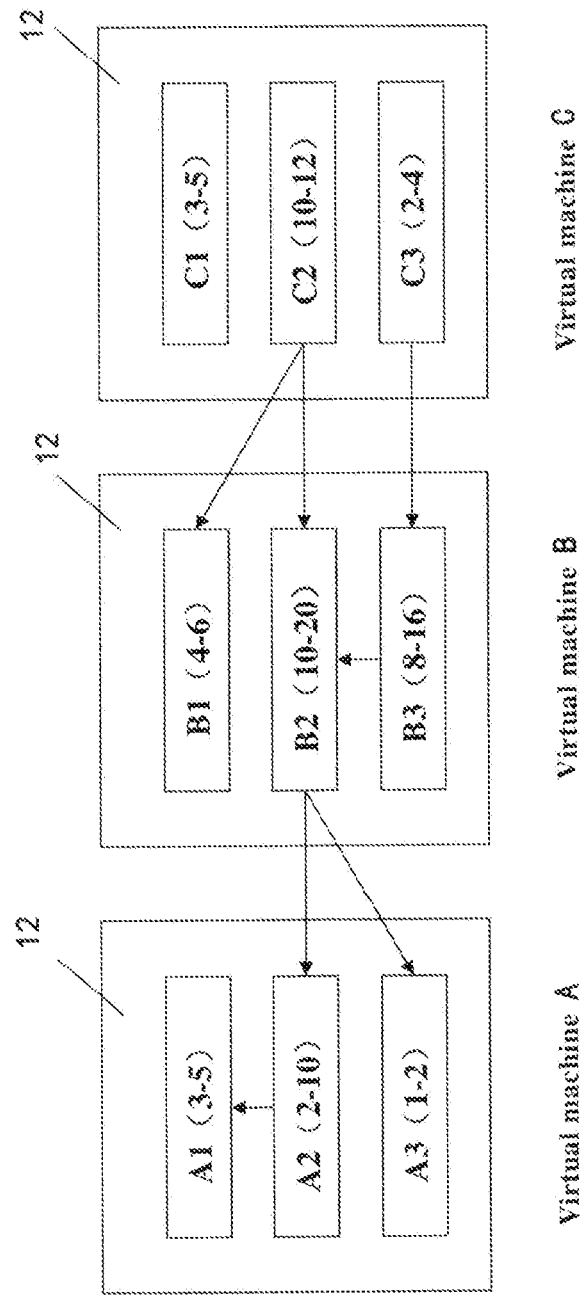
FIG. 8A shows an instance of the dependence relations among the activation items in the virtual machines.
Figure 9B:
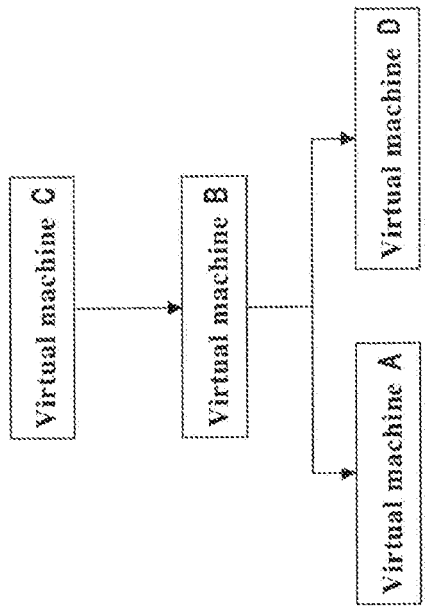
FIG. 9B shows a virtual machine whole dependence relation tree corresponding to the instance of FIG. 8B.
Figure 9A:
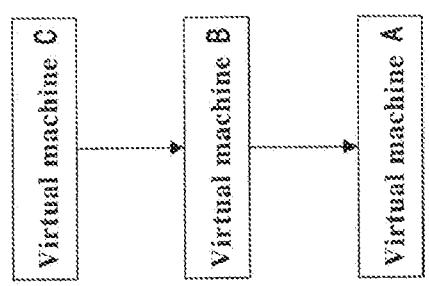
FIG. 9A shows a virtual machine whole dependence relation tree corresponding to the instance of FIG. 8A.

As an instance, as shown in FIG. 8A, the activation of the activation items A2 and A3 in the virtual machine A depends on the activation of the activation item B2 in the virtual machine B, the activation of the activation items B1 and B2 in the virtual machine B depends on the activation of the activation item C2 in the virtual machine C, and the activation of the activation item B3 in the virtual machine B depends on the activation of the activation item C3 in the virtual machine C. Since the number of the activation items in the virtual machine A whose activation depends on the activation of the activation items in the virtual machine B is 2, and the number of the activation items in the virtual machine B whose activation depends on the activation of the activation items in the virtual machine A is 0, it is determined that the activation of the virtual machine A as a whole depends on the activation of the virtual machine B. Due to similar reasons, the activation of the virtual machine B as a whole depends on the activation of the virtual machine C. Therefore, the whole dependence relation tree as shown in FIG. 9A can be drawn. In the whole dependence relation tree of FIG. 9A, the virtual machine which is at the bottom layer and is most independent on is the virtual machine A, and the virtual machine which is at the top layer and is most dependent on is the virtual machine C. The finally determined initial planning order is A>B>C.

Figure 8B:
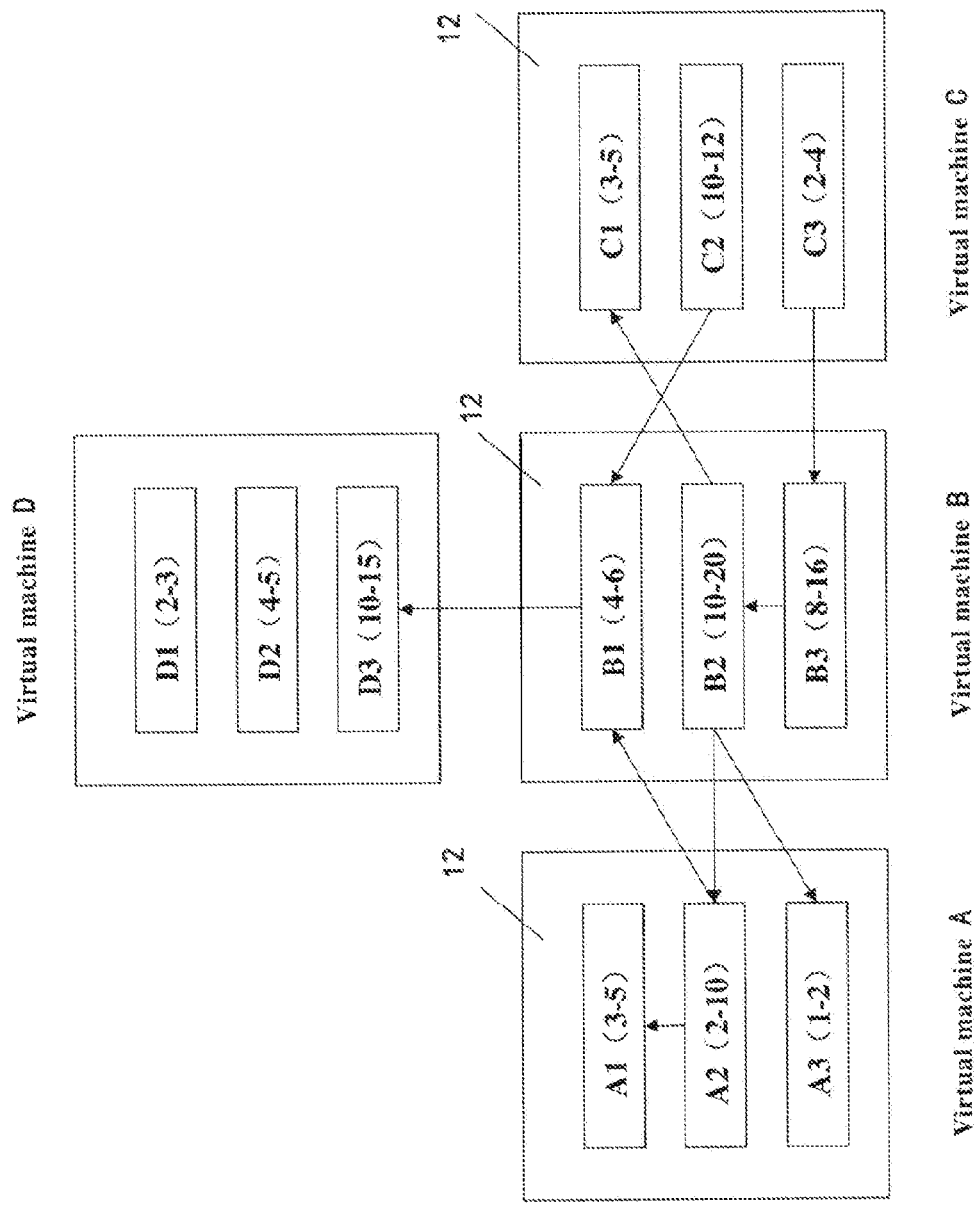
FIG. 8B shows another instance of the dependence relations among the activation items in the virtual machines.

As another instance, as shown in FIG. 8B, the activation of the activation items A2 and A3 in the virtual machine A depends on the activation of the activation item B2 in the virtual machine B, and the activation of the activation item B1 in the virtual machine B depends on the activation of the activation item A2 in the virtual machine A. The activation of the activation items B1 and B3 in the virtual machine B respectively depends on the activation of the activation items C2 and C3 in the virtual machine C, and the activation of the activation item C1 in the virtual machine C depends on the activation of the activation item B2 in the virtual machine B. The activation of the activation item D3 in the virtual machine D depends on the activation of the activation item B1 in the virtual machine B. Since the number that activation of an activation item in the virtual machine A depends on activation of an activation item in the virtual machine B is 2, and the number that activation of an activation item in the virtual machine B depends on activation of an activation item in the virtual machine A is 1, it is determined that the activation of the virtual machine A as a whole depends on the activation of the virtual machine B. Due to similar reasons, the activation of the virtual machine B as a whole depends on the activation of the virtual machine C, and the activation of the virtual machine D as a whole depends on the activation of the virtual machine B. Therefore, the whole dependence relation tree as shown in FIG. 9B can be drawn. In the whole dependence relation tree of FIG. 9B, the virtual machine which is at the bottom layer and is most independent on is the virtual machine A, D, so either of the two can be selected as the first one preceding the other in the initial planning order. The virtual machine which is at the top layer and is most dependent on is the virtual machine C. The finally determined initial planning order is A>D>B>C.

The above only shows an implementation of determining the initial planning order of the virtual machine, but the invention is not restricted to the implementation. It is obvious for those skilled in the art benefited from the present disclosure to determine other implementations for determining the initial planning order of the virtual machine.

Subsequently, the activation order of the activation items inside the virtual machines is optimized with respect to each virtual machine, according to the initial planning order of the virtual machines. In an implementation, all possible other activation orders of the activation items that do not violate the dependence relations are listed with respect to selected virtual machine. For all possible activation orders of the activation items, on the premise that the determined activation order of the activation items inside other virtual machines is unchanged, an optimal overall deployment simulation parameter is found according to deployment simulation parameters of the activation items. The activation order of the activation items corresponding to the optimal overall deployment simulation parameter is determined as the optimized activation order of the activation items in the virtual machine.

Still taking the instance of FIG. 8A for example, in the instance of FIG. 8A, the finally determined initial planning order is A>B>C. The activation orders of the activation items inside the virtual machine are randomly determined for the virtual machines A, B and C as: A3>A2>A1; B3>B1>B2; C1>C2>C3, respectively.

First the virtual machine A is selected. For the virtual machine A, all possible other activation orders of the activation items that do not violate the dependence relations are: A2>A3>A1, and A2>A1>A3. It is assumed that B3>B1>B2 and C1>C2>C3 maintain unchanged. The activation time serves as the deployment simulation parameter. For example, A1(3-5) in FIG. 8A represents that the activation time of the activation item A1 is 3 to 5 minutes. Through simulation, it can be finally deduced that, the overall activation time of the virtual machines A, B and C in case of A2>A3>A1, B3>B1>B2, C1>C2>C3 is 56.56 minutes. The overall activation time of the virtual machines A, B and C in case of A3>A2>A1, B3>B1>B2, C1>C2>C3 is 56.57 minutes. The overall activation time of the virtual machines A, B and C in case of A2>A1>A3, B3>B1>B2, C1>C2>C3 is 56.58 minutes. Therefore, it is determined that A2>A3>A1 is the optimized activation order of the activation items in the virtual machine A.

Then the virtual machine B is selected. For the virtual machine B, other all possible activation orders of the activation items that do not violate the dependence relations are: B1>B3>B2 and B3>B2>B1. It is assumed that A2>A3>A1 and C1>C2>C3 maintain unchanged. Through simulation, it can be finally deduced that, the overall activation time of the virtual machines A, B and C in case of A2>A3>A1, B3>B1>B2, C1>C2>C3 is 56.55 minutes. The overall activation time of the virtual machines A, B and C in case of A3>A2>A1, B1>B3>B2, C1>C2>C3 is 56.57 minutes. The overall activation time of the virtual machines A, B and C in case of A2>A3>A1, B3>B2>B1, C1>C2>C3 is 54.48 minutes. Therefore, it is determined that B3>B2>B1 is the optimized activation order of the activation items in the virtual machine B.

Then the virtual machine C is selected. For the virtual machine C, other all possible activation orders of the activation items that do not violate the dependence relations are: C1>C3>C2, C2>C1>C3, C2>C3>C1, C3>C1>C2, and C3>C2>C1. It is assumed that A2>A3>A1 and B3>B2>B1 maintain unchanged. Through simulation, it can be finally deduced that, the overall activation time of the virtual machines A, B and C in case of A2>A3>A1, B3>B2>B1, C1>C2>C3 is 54.55 minutes. The overall activation time of the virtual machines A, B and C in case of A2>A3>A1, B3>B2>B1, C1>C3>C2 is 45.44 minutes. The overall activation time of the virtual machines A, B and C in case of A2>A3>A1, B3>B2>B1, C1>C2>C3 is 54.48 minutes. The overall activation time of the virtual machines A, B and C in case of A2>A3>A1, B3>B2>B1, C2>C3>C1 is 52.39 minutes. The overall activation time of the virtual machines A, B and C in case of A2>A3>A1, B3>B2>B1, C3>C1>C2 is 43.55 minutes. The overall activation time of the virtual machines A, B and C in case of A2>A3>A1, B3>B2>B1, C3>C2>C1 is 40.57 minutes. Therefore, it is determined that C3>C2>C1 is the optimized activation order of the activation items in the virtual machine C.

The above only shows an implementation of determining one by one the optimized activation orders of the activation items inside the virtual machines. However, the invention is not restricted to the implementation. It is obvious for those skilled in the art benefited from the present disclosure to use other implementations for determining one-by-one the optimized activation orders of the activation items inside the virtual machines. For example, possible activation orders of all activation items can be listed for the selected virtual machines, without consideration of the dependence relations. However, since those activation orders that violate the dependence relations cannot generate simulation results in the simulation, they are naturally eliminated from selection.

Subsequently, the optimized activation orders of the activation items are re-optimized. The function of re-optimization is that, in the above optimizing process, the optimization is performed on the premise that the determined activation orders of the activation items inside other virtual machines maintain unchanged, but the activation orders of the activation items inside other virtual machines are randomly determined and thus are not optimal, so the final optimization result is affected. Therefore, re-optimization is preferable.

In an implementation, the process returns to the first virtual machine in the initial planning order. Then, the procedure of listing other all possible activation orders of the activation items through optimizing the activation order of the activation items in the virtual machine is executed, and it is judged whether the optimized activation order of the activation items in the virtual machine is changed or not. Then the next virtual machine in the initial planning order is selected, and the procedure of listing other all possible activation orders of the activation items through optimizing the activation order of the activation items in the virtual machine is executed, and it is judged whether the optimized activation order of the activation items in the virtual machine is changed or not, until it is judged that the number of times that the activation order is not changed reaches n where n denotes a total number of the virtual machines.

Still take the instance of FIG. 8A for example. The process firstly returns to the virtual machine A. The procedure of listing other all possible activation orders of the activation items through optimizing the activation order of the activation items in the virtual machine is executed. The final simulation result shows that, A2>A3>A1 is still the optimal activation order. Then a similar process is repeated for the virtual machine B. The final simulation result shows that, B3>B2>B1 is still the optimal activation order. A similar process is repeated for the virtual machine C. The final simulation result shows that, C3>C2>C1 is still the optimal activation order. Since the optimal activation orders maintain unchanged for three times, A2>A3>A1, B3>B2>B1 and C3>C2>C1 are the re-optimized optimized activation orders.

In another implementation, it does not judge whether re-optimization is paused or not according to the number of times that the optimized activation order is changed, but simply returns to the first virtual machine in the initial planning order, and the process of optimizing the activation order of the activation items inside the virtual machines is performed as above once again from the first virtual machine to the last virtual machine. Of course, the implementations for re-optimizing the activation order of the activation items are not restricted to the above two implementations. Other implementations are also apparent to those skilled in the art benefited from the above two implementations. As an implementation, the deployment simulation parameters may be stored in advance.

As another implementation, the deployment simulation parameters may be input by the user. The invention receives the user inputted deployment simulation parameters for simulation to determine the optimized activation order. The process of determining the optimized activation order has been described above in combination with the activation time. However, it is apparent to those skilled in the art that, other deployment simulation parameters such as failure probability, network condition, failure recovery probability can be used for determining the optimized activation order. In addition, a combination of two or more of the activation time, failure probability, network condition, failure recovery probability can be used for determining the optimized activation order. Two or more of the deployment simulation parameters may be weighted to compute a composite deployment simulation parameter, and the optimized activation order of the activation items in the virtual machines can be determined according to the composite deployment simulation parameter.

Subsequently, the activation logical file is generated according to the optimized activation order and the activation item descriptive parameters. As shown in FIG. 6, the activation item descriptive parameters and the finally determined optimized activation orders inside the virtual machines are automatically written in the activation logical file.

Figure 10:
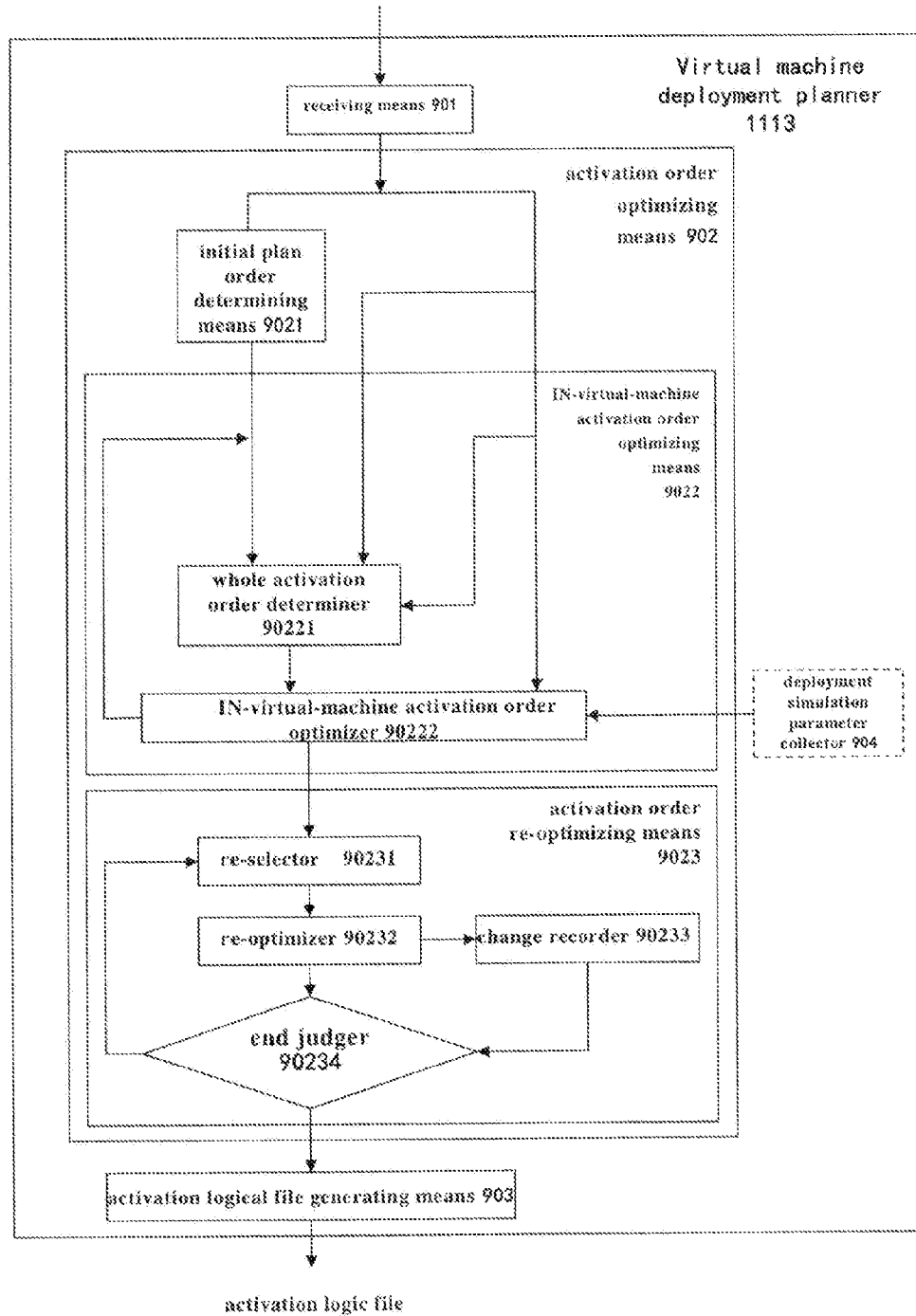
FIG. 10 is a block diagram showing a virtual machine deployment planner according to an embodiment of the invention.

FIG. 10 is a block diagram showing a virtual machine deployment planner 1113 according to an embodiment of the invention. The virtual machine deployment planner 1113 comprises receiving means 901, activation order optimizing means 902 and activation logical file generating means 903. The receiving means 901 receives the dependence relations among the activation items in a plurality of virtual machines and activation item descriptive parameters. The activation order optimizing means 902 optimizes an activation order of the activation items in the virtual machines according to the dependence relations among the activation items. The activation logical file generating means 903 generates an activation logical file according to the optimized activation order and the activation item descriptive parameters.

The activation order optimizing means 902 comprises initial plan order determining means 9021, and IN-virtual-machine activation order optimizing means 9022. Optionally, the activation order optimizing means 902 further comprises activation order re-optimizing means 9023. The initial plan order determining means 9021 determines an initial planning order of the virtual machine. The IN-virtual-machine activation order optimizing means 9022 optimizes the activation order of the activation items inside the virtual machines with respect to each virtual machine, according to the initial plan order of the virtual machine. The activation order re-optimizing means 9023 re-optimizes the optimized activation order of the activation items.

The initial plan order determining means 9021 determines the initial plan order of the virtual machines based on the following criterion: if a number that activation of an activation item in a virtual machine depends on activation of an activation item in another virtual machine is larger than a number that activation of an activation item in the another virtual machine depends on activation of an activation item in the virtual machine, it is determined that the activation of the virtual machine as a whole depends on the activation of the another virtual machine; if not, it is determined that the activation of the another virtual machine as a whole depends on the activation of the virtual machine; a whole dependence relation tree is drawn according to the determined dependence relations of activation of the virtual machines; the initial planning order is determined according to an order from a virtual machine which is most independent on to a virtual machine which is most dependent on in the whole dependence relation tree, wherein an order of activating the virtual machines which are equally dependent on is arbitrarily selected.

The IN-virtual-machine activation order optimizing means 9022 comprises: a whole activation order determiner 90221 and an IN-virtual-machine activation order optimizer 90222. The whole activation order determiner 90221 lists all possible activation orders of the activation items that do not violate the dependence relations for the selected virtual machines. The IN-virtual-machine activation order optimizer 90222 finds out an optimal overall deployment simulation parameter according to deployment simulation parameters of the activation items, on the premise that the determined activation order of the activation items inside other virtual machines is unchanged, for all possible activation orders of the activation items, determines the activation order of the activation items corresponding to the optimal overall deployment simulation parameter as the optimized activation order of the activation items in the virtual machine, and instructs the virtual machine selector to select the next virtual machine.

The optimized activation order re-optimizing means 9023 comprises a re-selector 90231, a re-optimizer 90232, a change recorder 90233, and an end judger 90234. The re-selector 90231 re-selects the first virtual machine in the initial plan order. For the selected virtual machine, the re-optimizer 90232 lists other all possible activation orders of the activation items that do not violate the dependence relations, finds out an optimal overall deployment simulation parameter according to deployment simulation parameters of the activation items, on the premise that the determined activation order of the activation items inside other virtual machines is unchanged, for all possible activation orders of the activation items, and determines the activation order of the activation items corresponding to the optimal overall deployment simulation parameter as the optimized activation order of the activation items in the virtual machine. The change recorder 90233 records in case where the optimized activation order of the activation items in the virtual machine is changed. The end judger 90234 ends the re-optimization in case where the number of times that the recorded optimized activation order is not changed reaches n where n denotes a total number of the virtual machines. Optionally, the virtual machine deployment planner 1113 further comprises a deployment simulation parameter collector 904, for receiving the deployment simulation parameters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in any tangible medium of expression having computer usable program code embodied therein.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium supporting for example the Internet or Intranet, or a magnetic storage device. Note that the computer usable or computer readable medium even may be paper or other suitable medium on which programs are printed, and this is because the programs can be obtained electronically by electrically scanning the paper or other medium, and then be compiled, interpreted or processed appropriately, and be stored in a computer memory if necessary. In the context of this document, a computer usable or computer readable storage medium may be any medium that contains, stores, communicates, propagates, or transmits a program for use by or in connection with an instruction execution system, apparatus, or device. A computer useable medium may include a data signal with computer usable program code embodied therein, propagated in baseband or as part of a carrier wave. The computer usable program code may be transmitted using any appropriate medium, including but not limited to wireless, wireline, optical fiber cable, RF, etc.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the computer or other programmable data processing apparatus, create means for implementing the functions/acts specified in the blocks of the flowchart illustrations and/or block diagrams.

These computer program instructions may also be stored in a computer readable medium that can direct a computer or other programmable data processing apparatus to function in a particular manner, such that the instructions stored in the computer readable medium produce an article of manufacture including instruction means which implement the functions/acts specified in the blocks of the flowchart illustrations and/or block diagrams.

The computer program instructions may also be loaded onto a computer or other programmable data processing apparatus to cause a series of operational steps to be performed on the computer or other programmable data processing apparatus to produce a computer implemented process such that the instructions which execute on the computer or other programmable apparatus provide processes for implementing the functions/acts specified in the blocks of the flowchart illustrations and/or block diagrams.

The flowchart illustrations and block diagrams in the figures illustrate the architecture, functionality, and operation of possible implementations of systems, methods and computer program products according to various embodiments of the present invention. In this regard, each block in the flowchart illustrations or block diagrams may represent a module, program segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable those of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A virtual machine deployment planning method comprising the steps of:
receiving information about relationships of activation items in a plurality of virtual machines; said information also including activation item descriptive parameters;
optimizing an activation order of said activation items in said virtual machines according to said relationships among said activation items by:
determining an initial planning order of the virtual machines by:
determining if a number of an activation item in a virtual machine which depends on activation of an activation item in another virtual machine is larger than a number of an activation item in said another virtual machine which also depends on activation of an activation item in said virtual machine,
further determining if the activation of said virtual machine as a whole depends on the activation of said another virtual machine and if not, also determining if said activation of said another virtual machine as a whole depends on said activation of said virtual machine;
constructing a whole dependence relationship tree according to determined dependence relations of activation of said virtual machines; and
determining initial planning order according to an order from a virtual machine which is either most independent or dependent on any virtual machine by examining said relationship tree, wherein an order of activating said virtual machines which are equally dependent on is arbitrarily is selected; and with respect to each of said virtual machines, optimizing said activation order of the activation items inside the virtual machine according to said initial planning order of said virtual machines; and generating an activation logical file according to said optimized activation order and said activation item descriptive parameters.

2. A virtual machine deployment planning method according to claim 1, wherein the step of optimizing an activation order of said activation items in said virtual machines is according to determining any dependence in the relationships among said activation items.

3. A virtual machine deployment planning method according to claim 2, wherein the step of optimizing an activation order of said activation items in said virtual machines is according among said activation items further comprises: re-optimizing said optimized activation order of the activation items.

4. A virtual machine deployment planning method according to claim 2, wherein the step of optimizing said activation order further comprises:
a) determining and listing all possible activation orders of said activation items that do not violate any dependence relations between selected virtual machines,
b) finding for all possible activation orders of said activation items, an optimal overall deployment simulation parameter according to deployment simulation parameters of said activation items, said overall parameter determined on a premise that any determined activation order of said activation items inside other virtual machines remains unchanged; and
c) determining the activation order of the activation items corresponding to said optimal overall deployment simulation parameter as said optimized activation order of the activation items in the virtual machine.

5. A virtual machine deployment planning method according to claim 4, wherein the step of re-optimizing said optimized activation order of said activation items further comprises:
d) returning to a first virtual machine in said initial planning order;
e) executing the steps a) to c) and judging whether said optimized activation order of said activation items in said virtual machine is changed or not; and
f) selecting a next virtual machine in said initial planning order and executing step e) until it is judged that said number of times that said activation order is not changed and/or until it reaches n items, where n denotes a total number of the virtual machines.

6. A virtual machine deployment planning method according to claim 5, further comprising: receiving said deployment simulation parameters.

7. A virtual machine deployment planning method according to claim 4, wherein said deployment simulation parameter is one selected from a group consisting of: activation time, failure probability, network condition, and failure recovery probability.

8. A virtual machine deployment planning method according to claim 7 wherein said deployment simulation parameters are two or more selected from said group consisting of: activation time, failure probability, network condition, and failure recovery probability, wherein two or more of the deployment simulation parameters are weighted to compute a composite deployment simulation parameter, and the activation order of the activation items in the virtual machines is determined according to the composite deployment simulation parameter.

9. A virtual machine deployment planer comprising:
receiving means for receiving dependence relationships among activation items in a plurality of virtual machines and activation item descriptive parameters;
activation order optimizing means for optimizing an activation order of said activation items in said virtual machines according to the dependence relationships among said activation items, wherein said activation order optimizing means comprises:
an initial planning order determining means for determining an initial planning order of said virtual machines; and
an IN-virtual-machine activation order optimizing means for, with respect to each of the virtual machines, optimizing said activation order of said activation items inside said virtual machine according to said initial planning order of said virtual machines; and
activation logical file generating means for generating an activation logical file according to said optimized activation order and the activation item descriptive parameters,
wherein said activation order optimizing means has an activation order re-optimizing means for re-optimizing the optimized activation order of the activation items and wherein said initial planning order determining means determines an initial planning order of said virtual machines according to said following criterion:
determining if a number of an activation item in a virtual machine which depends on activation of another item in another virtual machine is larger than a number an activation item in another virtual machine and if so then determining if said activation of the virtual machine as a whole depends on said activation of the another virtual machine;
if said number is not larger, then determining said activation of another virtual machine as a whole depends on said activation of the virtual machine if said number is not larger;
drawing a whole dependence relationship tree according to determined dependence relationship of activation of said virtual machines; and
determining said initial planning order according to an order from a virtual machine which is most independent on to a virtual machine which is most dependent on a whole dependence relationship tree, wherein an order of activating the virtual machines which are equally dependent on is arbitrarily selected.

10. A virtual machine deployment planner according to claim 9, wherein said IN-virtual-machine activation order optimizing means further comprises:
a whole activation order determiner for listing all possible activation orders of the activation items that do not violate the dependence relations, with respect to selected virtual machines; and
an IN-virtual-machine activation order optimizer for, with respect to all possible activation order of the activation items, finding out an optimal overall deployment simulation parameter according to deployment simulation parameters of the activation items, on premise that said determined activation order of said activation items inside other virtual machines is unchanged, and determining said activation order of the activation items corresponding to said optimal overall deployment simulation parameter as said optimized activation order of the activation items in said virtual machine.

11. A virtual machine deployment planner according to claim 9, wherein said activation order re-optimizing means further comprises:
a re-selector for re-selecting a first virtual machine in said initial plan order;
a re-optimizer for listing other all possible activation orders of said activation items that do not violate the dependence relations with respect to the selected virtual machine, with respect to all possible activation orders of the activation items, finding out an optimal overall deployment simulation parameter according to deployment simulation parameters of the activation items, on said premise that said determined activation order of said activation items inside other virtual machines is unchanged, and determining said activation order of the activation items corresponding to said optimal overall deployment simulation parameter as the optimized activation order of the activation items in the virtual machine;
a change recorder for recording in case where said optimized activation order of the activation items in said virtual machine is changed; and
an end judger for ending the re-optimization in case where number of times that a recorded optimized activation order is not changed reaches n where n denotes a total number of the virtual machines.

12. A virtual machine deployment planner according to claim 10, further comprising a deployment simulation parameter collector for receiving the deployment simulation parameters and wherein said deployment simulation parameter is one selected from the group consisting of: activation time, failure probability, network condition, and failure recovery probability.

* * * * *